(12) United States Patent
Lee et al.

(10) Patent No.: US 10,677,901 B2
(45) Date of Patent: Jun. 9, 2020

(54) ULTRASOUND DIAGNOSIS APPARATUS AND METHOD OF OPERATING THE ULTRASOUND DIAGNOSIS APPARATUS

(71) Applicants: SAMSUNG MEDISON CO., LTD., Hongcheon-gun (KR); SOGANG UNIVERSITY RESEARCH FOUNDATION, Seoul (KR)

(72) Inventors: Woo-youl Lee, Hongcheon-gun (KR); Yangmo Yoo, Seoul (KR); Jinbum Kang, Seoul (KR)

(73) Assignees: SAMSUNG MEDISON CO., LTD., Hongcheon-gun (KR); SOGANG UNIVERSITY RESEARCH FOUNDATION, Seoul (KR)

( * ) Notice: Subject to any disclaimer, the term of this patent is extended or adjusted under 35 U.S.C. 154(b) by 470 days.

(21) Appl. No.: 15/463,754

(22) Filed: Mar. 20, 2017

(65) Prior Publication Data
US 2017/0293023 A1    Oct. 12, 2017

Related U.S. Application Data

(60) Provisional application No. 62/320,041, filed on Apr. 8, 2016.

(30) Foreign Application Priority Data

Jul. 29, 2016    (KR) .................. 10-2016-0097026

(51) Int. Cl.
*G01S 7/52*    (2006.01)
*G01S 15/89*    (2006.01)

(52) U.S. Cl.
CPC ...... *G01S 7/52028* (2013.01); *G01S 7/52034* (2013.01); *G01S 7/52053* (2013.01); *G01S 15/8961* (2013.01); *G01S 7/52074* (2013.01)

(58) Field of Classification Search
CPC ............. G01S 7/52028; G01S 7/52034; G01S 15/8961; G01S 7/52053; G01S 7/52074
(Continued)

(56) References Cited

U.S. PATENT DOCUMENTS

| 4,673,941 A | * | 6/1987 | Van Der Mark | ..... G01S 13/282 342/194 |
| 5,107,841 A | * | 4/1992 | Sturgill | ............... G01S 15/8979 600/455 |

(Continued)

FOREIGN PATENT DOCUMENTS

| KR | 10-2012-0037918 A | 4/2012 |
| KR | 10-1282764 B1 | 7/2013 |

(Continued)

OTHER PUBLICATIONS

Ramalli et al., "A real-time chirp-coded imaging system with tissue attenuation", Ultrasonics, 2015, 11 pages total, p. 65-75, Elsevier B.V., Firenze, Italy.

(Continued)

*Primary Examiner* — Daniel L Murphy
(74) *Attorney, Agent, or Firm* — Sughrue Mion, PLLC

(57) ABSTRACT

Provided is an ultrasound diagnosis apparatus that may include a data acquisition unit that acquires ultrasound data based on received echo signals from an object; and a processor that may estimate a center frequency of the ultrasound data and, based on the center frequency, perform pulse compression on the ultrasound data to generate short signals from elongated signals.

20 Claims, 9 Drawing Sheets

(58) Field of Classification Search
USPC .............................................................. 367/7
See application file for complete search history.

(56) References Cited

U.S. PATENT DOCUMENTS

| | | | |
|---|---|---|---|
| 5,938,611 A * | 8/1999 | Muzilla | G01S 7/52047 |
| | | | 600/455 |
| 8,162,838 B2 * | 4/2012 | Zhang | A61B 8/488 |
| | | | 600/407 |
| 8,795,180 B2 | 8/2014 | Wegener et al. | |
| 2010/0331689 A1 | 12/2010 | Wegener | |
| 2015/0247921 A1 * | 9/2015 | Rothberg | A61B 8/4254 |
| | | | 367/135 |
| 2017/0079620 A1 * | 3/2017 | Xie | A61B 8/485 |

FOREIGN PATENT DOCUMENTS

| | | |
|---|---|---|
| KR | 10-2015-0062361 A | 6/2015 |
| KR | 10-1550671 B1 | 9/2015 |

OTHER PUBLICATIONS

Yoon et al., "An Efficient Pulse Compression Method of Chrip-Coded Excitation in Medical Ultrasound Imaging", IEEE Transactions on Ultrasonics, Ferroelectrics, and Frequency Control, Oct. 10, 2013, 5 pages total, pp. 2225-pp. 2229, vol. 60, No. 10.

* cited by examiner

ULTRASOUND DIAGNOSIS APPARATUS AND METHOD OF OPERATING THE ULTRASOUND DIAGNOSIS APPARATUS

CROSS-REFERENCE TO RELATED APPLICATION

This application claims the benefits of U.S. Provisional Application No. 62/320,041, filed on Apr. 8, 2016 in the U.S. Patent & Trademark Office and Korean Patent Application No. 10-2016-0097026, filed on Jul. 29, 2016 in the Korean Intellectual Property Office, the disclosure of which are incorporated herein in their entirety by reference.

BACKGROUND

1. Field

One or more embodiments relate to an ultrasound diagnosis apparatus and a method of operating the same, and more particularly, to an ultrasound diagnosis apparatus and a method of operating the same, which perform pulse compression.

2. Description of the Related Art

Recently, various kinds of medical image apparatuses have become widely used, among them apparatuses for visualizing biological tissues of a human body to obtain information for the purpose of early diagnosis of various diseases and to help perform medical operations. Representative examples of such medical image apparatuses include ultrasound diagnosis apparatuses, computed tomography (CT) apparatuses, and magnetic resonance imaging (MRI) apparatuses.

Ultrasound diagnosis apparatuses transmit ultrasound signals generated by transducers of a probe to an object and receive echo signals reflected from the object, thereby obtaining at least one image of an internal part of the object. In particular, ultrasound diagnosis apparatuses are used for medical purposes including observation of the interior of an object, detection of foreign substances, and diagnosis of damage to the object. Such ultrasound diagnosis apparatuses are highly stable, display images in real time, and are safer than X-ray apparatuses due to the lack of radioactive exposure from ultrasound apparatuses. Therefore, ultrasound imaging apparatuses are widely used together with other image diagnosis apparatuses.

The spatial resolution and signal-to-noise (SNR) ratio are essential in medical ultrasound imaging in improving image quality. A high SNR ratio may be achieved by increasing the duration of pulses to be transmitted, i.e., by transmitting elongated pulses. However, in general, long pulse duration can cause a reduction in axial resolution determined by the time-bandwidth product (TBP). An increase of TBP should take precedence in obtaining a high SNR ratio and spatial resolution. Coded excitation, which may provide a high TBP, may increase a SNR ratio without reduction in axial resolution.

Transmission-focused signals, while traveling inside the human body, may cause frequency-dependent attenuation. As a result, in relation to the frequency band of receive-focused signals, the attenuation of high-frequency band components is relatively greater than that of low-frequency band components, consequently leading to downshift of the center frequency. This downshift of the center frequency, with regard to coded excitation, may result in a decrease in SNR ratio and resolution of the ultrasound image, positional distortion of the target, and energy loss.

SUMMARY

One or more embodiments include an ultrasound diagnosis apparatus that estimates a center frequency of input ultrasound data and performs pulse compression based on the estimated center frequency to perform adaptive pulse compression in consideration of frequency-dependent attenuation; and a method of operating the same.

Additional aspects will be set forth in part in the description which follows and, in part, will be apparent from the description, or may be learned by practice of the presented embodiments.

According to one or more embodiments, an ultrasound diagnosis apparatus includes a data acquisition unit that acquires ultrasound data, based on received echo signals from an object; and a processor that estimates a center frequency of the ultrasound data and performs pulse compression on the ultrasound data based on the center frequency to generate short signals from elongated signals.

According to one or more embodiments, a method of operating the ultrasound diagnosis apparatus includes acquiring ultrasound data, based on received echo signals from an object; estimating a center frequency of the ultrasound data; and performing pulse compression on the ultrasound data based on the center frequency to generate short signals from elongated signals.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
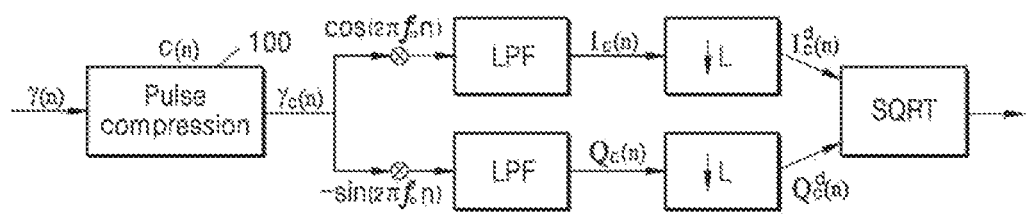
FIG. 1 is a block diagram showing a method of performing pulse compression on beamformed ultrasound data in the art.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The terms used in this specification are those general terms currently widely used in the art in consideration of functions regarding the inventive concept, but the terms may vary according to the intention of those of ordinary skill in the art, precedents, or new technology in the art. Also, some terms may be arbitrarily selected by the applicant, and in this case, the meaning of the selected terms will be described in detail in the detailed description of the present specification. Thus, the terms used herein have to be defined based on the meaning of the terms together with the description throughout the specification.

Throughout the specification, it will also be understood that when a component "includes" an element, unless there is another opposite description thereto, it should be understood that the component does not exclude another element and may further include another element. In addition, terms such as " . . . unit", " . . . module", or the like refer to units that perform at least one function or operation, and the units may be implemented as hardware or software or as a combination of hardware and software.

Throughout the specification, the term "image" may refer to multi-dimensional data composed of discrete image elements. For example, an image may be a medical image (an ultrasound image, a computed tomography (CT) image, or a magnetic resonance imaging (MRI) image) of an object acquired by an ultrasound diagnosis apparatus, a CT apparatus, an MRI apparatus, or another medical imaging apparatus.

An "object" may be a human, an animal, or a part of a human or animal. For example, the object may be an organ (e.g., the liver, the heart, the womb, the brain, a breast, or the abdomen), a blood vessel, or a combination thereof. Also, the object may be a phantom, which is a material having a density, an effective atomic number, and a volume that are approximately the same as those of an organism. For example, the phantom may be a spherical phantom having properties similar to a human body.

An ultrasound image may be an image obtained by transmitting ultrasound signals generated by transducers of a probe to an object and receiving echo signals reflected from the object. In addition, an ultrasound image may be variously implemented. For example, an ultrasound image may be at least one of an amplitude mode (A mode) image, a brightness mode (B mode) image, a color mode (C mode) image, and a Doppler mode (D mode) image. Furthermore, according to one or more embodiments, an ultrasound image may be a two-dimensional image or a three-dimensional image.

Throughout the specification, a "user" may be, but is not limited to, a medical expert, for example, a medical doctor, a nurse, a medical laboratory technologist, or a medical imaging expert, or a technician who repairs medical apparatuses.

Reference will now be made in detail to embodiments, examples of which are illustrated in the accompanying drawings. In this regard, the present embodiments may have different forms and should not be construed as being limited to the descriptions set forth herein.

FIG. 1 is a block diagram showing a method of performing pulse compression on beamformed ultrasound data in the art.

In pulse compression techniques, temporally long code signals having a relatively low voltage are used as transmitting signals instead of short transmitting signals having a high peak voltage, and a pulse compressor, such as a correlator, is used in an ultrasound receiver to obtain the same axial resolution as when using short transmitting signals. This method of transmitting temporally long code signals is known as coded excitation. In ultrasound diagnosis apparatuses, coded signals used in coded excitation techniques may be signals, to which pulse compression may be applied, having a large time-bandwidth product (TBP). Chirp codes, Golay codes, or Barker codes may be used as coded signals.

Referring to FIG. 1, an ultrasound diagnosis apparatus performs pulse compression on beamformed ultrasound data $\gamma(n)$ by using a compression filter having a compression filter coefficient $c(n)$. After carrying out the pulse compression, the ultrasound diagnosis apparatus may perform I/Q demodulation on pulse-compressed ultrasound data to generate complex baseband data $I_c(n)$ and $Q_c(n)$. Furthermore, the ultrasound diagnosis apparatus may perform L-fold decimation on complex baseband data to reduce a data rate, followed by square root (SQRT) calculation, to thereby extract envelope information.

In the pulse compression method illustrated in FIG. 1, pulse compression may be performed on radio frequency (RF) data, and thus hundreds of filter taps may be required to sufficiently improve a signal-to-noise (SNR) ratio, consequently leading to an increase of computational complexity. Furthermore, the pulse compression is performed without consideration of a center frequency downshift, resulting in a decrease in SNR ratio and resolution of the ultrasound image, positional distortion of the target, and energy loss.

Hereinafter, an ultrasound diagnosis apparatus according to an embodiment will be described in detail, the ultrasound diagnosis apparatus may estimate a center frequency of received ultrasound data and perform pulse compression based on the estimated center frequency.

Figure 2:
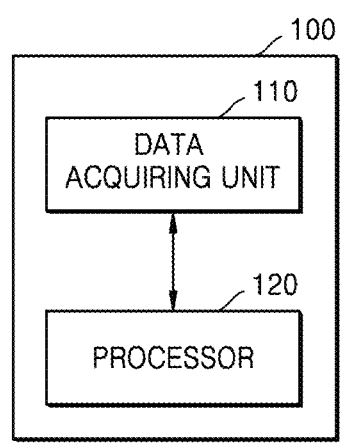
FIG. 2 is a block diagram showing a configuration of an ultrasound diagnosis apparatus, according to an embodiment.

FIG. 2 is a block diagram showing a configuration of an ultrasound diagnosis apparatus, according to an embodiment. An ultrasound diagnosis apparatus 100 according to an embodiment may be an ultrasound diagnosis apparatus that performs pulse compression.

Referring to FIG. 2, the ultrasound diagnosis apparatus 100 may include a data acquisition unit 110 and a processor 120. The data acquisition unit 110 according to an embodiment may acquire ultrasound data based on echo signals received from an object. Here, the received echo signals may be elongated, i.e., temporally long signals, and may be ultrasound echo signals received when coded signals are transmitted. In addition, the ultrasound data may include at least one piece of data from a variety of channel data for beamforming and beamformed RF data.

In addition, the processor 120 may estimate a center frequency of ultrasound data. For example, the processor 120 may estimate a center frequency using the ultrasound data as an input of an autoregressive model, but embodiments are not limited thereto. The processor 120 may, other than by using an autoregressive model, estimate a center frequency of the ultrasound data by using various center frequency estimation techniques of the related art.

In addition, the processor 120 may adaptively I/Q demodulate ultrasound data using an estimated center frequency to generate complex baseband data. Here, a cutoff frequency of a low-pass filter (LPF) used in I/Q demodulation may be determined based on the estimated center frequency.

In addition, the processor 120 may decimate complex baseband data. The processor 120 may perform pulse compression on decimated complex baseband data to generate short signals from elongated signals. Here, a coefficient of a pulse compression filter that performs pulse compression may be determined based on the estimated center frequency.

In addition, the processor 120 may extract envelope information from pulse-compressed data. For example, the processor 120 may extract envelope information by calculating a square root of the pulse-compressed data.

Based on the extracted envelope information, the ultrasound diagnosis apparatus 100 according to an embodiment may generate and display an ultrasound image.

Figure 3:
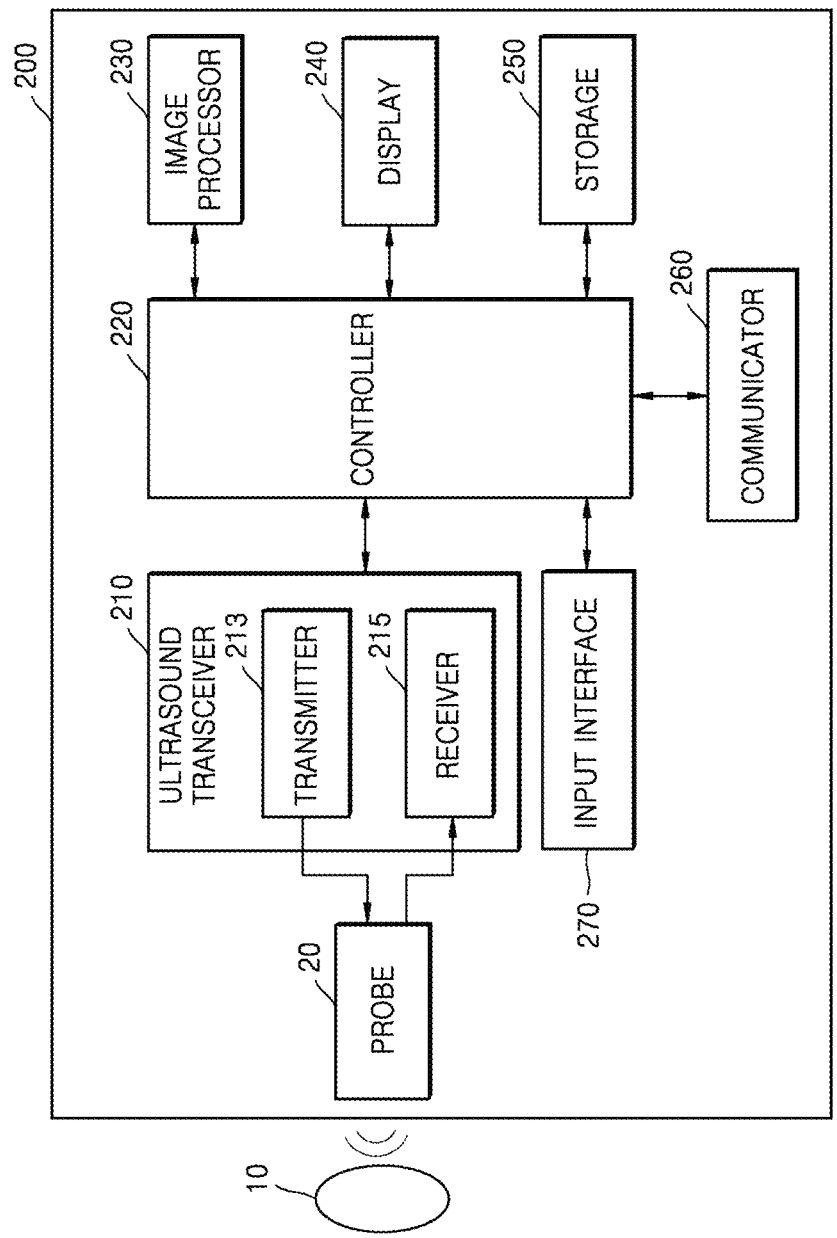
FIG. 3 is a block diagram showing a configuration of an ultrasound diagnosis apparatus, according to an embodiment.

FIG. 3 is a block diagram showing a configuration of an ultrasound diagnosis apparatus, according to an embodiment.

Referring to FIG. 3, an ultrasound diagnosis apparatus 200 according to an embodiment may include a probe 20, an ultrasound transceiver 210, a controller 220, an image processor 230, a display 240, a storage 250, a communicator 260, and an input interface 270.

The data acquisition unit 110 illustrated in FIG. 2 may correspond to the ultrasound receiver 215 illustrated in FIG. 3, and the processor 120 illustrated in FIG. 2 may correspond to the controller 220 in FIG. 3. Accordingly, descriptions of the data acquisition unit 110 and the processor 120 illustrated in FIG. 2 may respectively be applied to those of the ultrasound receiver 215 and the controller 220 illustrated in FIG. 3. Thus, the same repeated description thereof will be omitted here.

The ultrasound diagnosis apparatus 200 may be of a cart-type or a portable-type ultrasound diagnosis apparatus, that is portable, moveable, mobile, or hand-held. Examples of the portable-type ultrasound imaging apparatus 200 may include a smartphone, a laptop computer, a personal digital assistant (PDA), and a tablet personal computer (PC), each of which may include a probe and a software application, but embodiments are not limited thereto. For example, each of the examples above may have a probe that is built-in and shares the same external housing. Alternatively, each of the above may communicatively connect to the probe wirelessly or via wires, as further described below, The probe 20 may include a plurality of transducers. The plurality of transducers may transmit ultrasound signals to an object 10 in response to transmitting signals received by the probe 20, from a transmitter 213. The plurality of transducers may receive ultrasound signals reflected from the object 10 to generate reception signals. In addition, the probe 20 and the ultrasound diagnosis apparatus 200 may be formed in one body (e.g., disposed in a single housing), or the probe 20 and the ultrasound diagnosis apparatus 200 may be formed separately (e.g., disposed separately in separate housings) but linked wirelessly or via wires. In addition, the ultrasound diagnosis apparatus 200 may include one or more probes 20 according to embodiments.

The controller 220 may control the transmitter 213 for the transmitter 213 to generate transmitting signals to be applied to each of the plurality of transducers based on a position and a focal point of the plurality of transducers included in the probe 20.

The controller 220 may control the ultrasound receiver 215 to generate ultrasound data by converting reception signals received from the probe 20 from analogue to digital signals and summing the reception signals converted into digital form, based on a position and a focal point of the plurality of transducers.

The image processor 230 may generate an ultrasound image by using ultrasound data generated from the ultrasound receiver 215. For example, the image processor 230 may generate an ultrasound image by using envelope information extracted from the ultrasound receiver 215.

The display 240 may display the generated ultrasound image and various pieces of information processed by the ultrasound diagnosis apparatus 200. The ultrasound diagnosis apparatus 200 may include two or more displays 240 according to embodiments. The display 240 may include a touch screen in combination with a touch panel.

The controller 220 may control the operations of the ultrasound diagnosis apparatus 200 and flow of signals between the internal elements of the ultrasound diagnosis apparatus 200. The controller 120 may include a memory for storing a program or data to perform functions of the ultrasound diagnosis apparatus 200 and a processor and/or a microprocessor (not shown) for processing the program or data. For example, the controller 220 may control the operation of the ultrasound diagnosis apparatus 200 by receiving a control signal from the input interface 270 or an external apparatus.

The ultrasound diagnosis apparatus 200 may include the communicator 260 and may be connected to external apparatuses, for example, servers, medical apparatuses, and portable devices such as smart phones, tablet personal computers (PCs), wearable devices, etc., via the communicator 260.

The communicator 260 may include at least one element capable of communicating with the external apparatus. For example, the communicator 260 may include at least one among a short-range communication module, a wired communication module, and a wireless communication module.

The communicator 260 may receive a control signal and data from an external apparatus and transmit the received control signal to the controller 220, so that the controller 220 may control the ultrasound diagnosis apparatus 200 in response to the received control signal.

The controller 220 may transmit a control signal to an external apparatus via the communicator 260 so that the external apparatus may be controlled in response to the control signal of the controller 220.

For example, the external apparatus connected to the ultrasound diagnosis apparatus 200 may process data of the external apparatus in response to control signal of the controller 220 received via the communicator 260.

A program for controlling the ultrasound diagnosis apparatus 200 may be installed in the external apparatus. The program may include command languages to perform part of operation of the controller 220 or the entire operation of the controller 220.

The program may be pre-installed in the external apparatus or may be installed by a user of the external apparatus by downloading the program from a server that provides applications. The server that provides applications may include a recording medium where the program is stored.

The storage 250 may store various data or programs for driving and controlling the ultrasound diagnosis apparatus 200, input and/or output ultrasound data, ultrasound images, applications, etc.

The input interface 270 may receive a user's input to control the ultrasound diagnosis apparatus 200 and may include a keyboard, button, keypad, mouse, trackball, jog switch, knob, a touchpad, a touch screen, a microphone, a motion input means, a biometrics input means, etc. For example, the user's input may include inputs for manipulating buttons, keypads, mice, track balls, jog switches, or knobs, inputs for touching a touchpad or a touch screen, a voice input, a motion input, and a bioinformation input, for example, iris recognition or fingerprint recognition, but an exemplary embodiment is not limited thereto.

Figure 4:
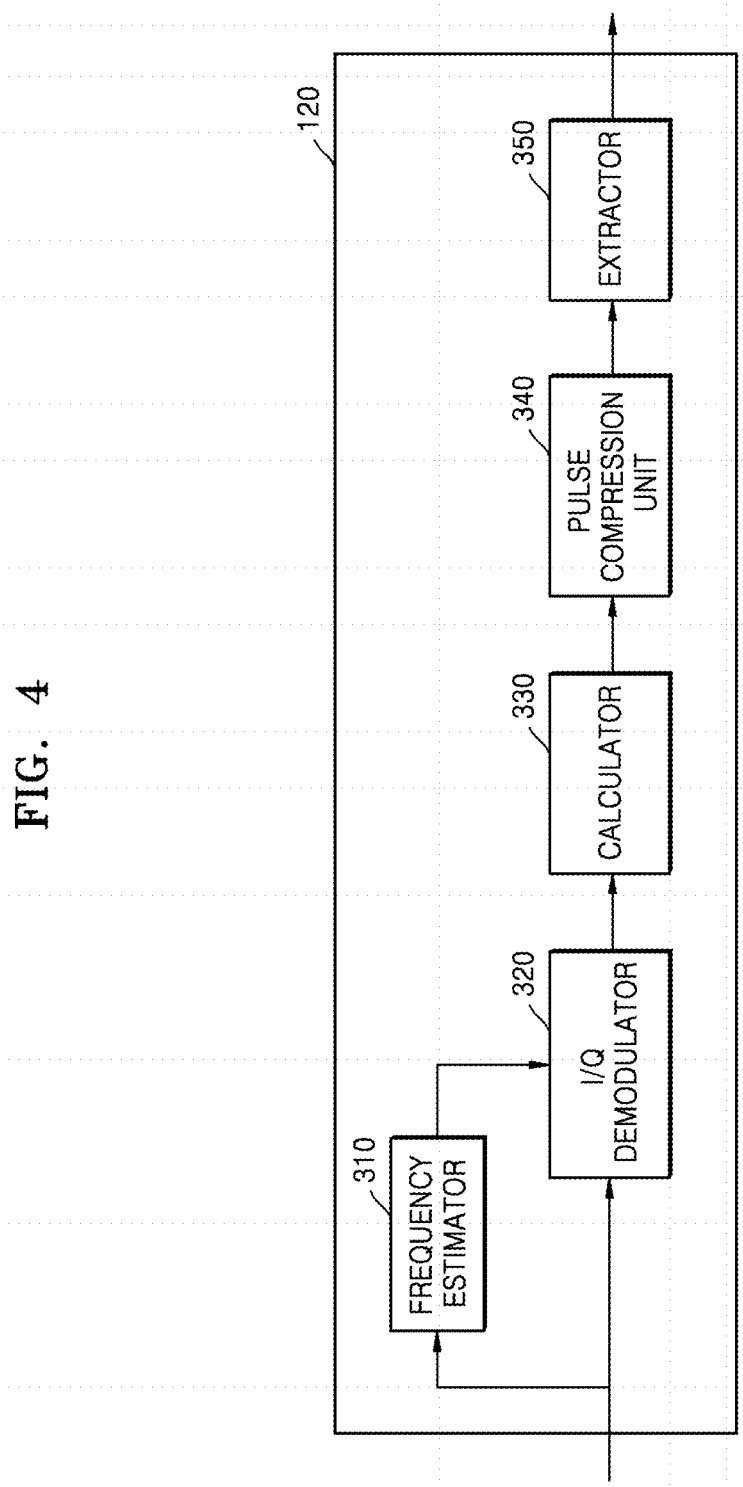
FIG. 4 is a block diagram showing a configuration of a processor according to an embodiment.
Figure 5:
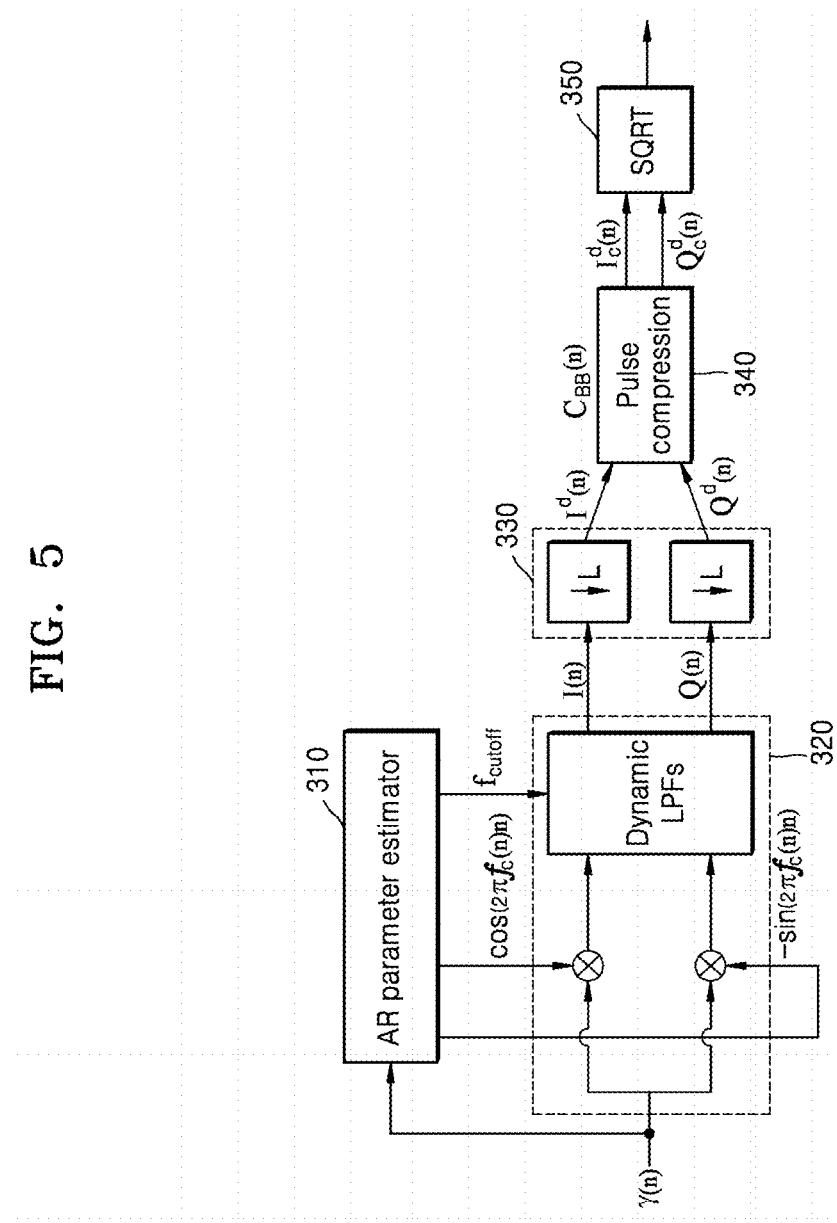
FIG. 5 is a block diagram showing an example of a pulse compression method performed by the processor illustrated in FIG. 4.

FIG. 4 is a block diagram showing a configuration of a processor according to an embodiment. FIG. 5 is a block diagram showing an example of a pulse compression method performed by the processor illustrated in FIG. 4.

Referring to FIG. 4, the processor 120 may include a frequency estimator 310, an I/Q demodulator 320, a calculator 330, a pulse compression unit 340, and an extractor 350.

The frequency estimator 310 may estimate a center frequency of input ultrasound data. For example, the frequency estimator 310 may estimate a center frequency of input ultrasound data using an autoregressive model. However, embodiments are not limited thereto.

An autoregressive model is a method of easy mathematical modeling of complicated systems with a combination of a number of parameters. As shown by Equation 1, in an autoregressive model, a system output estimated value at time n $\tilde{s}(n)$ may be modeled as a linear combination of values output in the past.

$$\tilde{s}(n) = -\Sigma_{i=1}^{p} a_i r(n-i) + e(n) \qquad \text{Equation 1}$$

where e(n) indicates an estimation error of a modeled system, and an optimum model parameter $a_i$ (i=1, 2, ..., p) may be a value having a minimum variance of e(n). Therefore, parameters in the autoregressive model may be determined to minimize the estimation error, and may be obtained through Yule-Walker equation.

$$\begin{bmatrix} R_{rr}(0) & R_{rr}(1) & \cdots & R_{rr}(1) \\ \vdots & \ddots & \ddots & \vdots \\ R_{rr}(p-2) & \cdots & \cdots & R_{rr}(1) \\ R_{rr}(p-1) & R_{rr}(p-2) & \cdots & R_{rr}(0) \end{bmatrix} \begin{bmatrix} a_1 \\ \vdots \\ a_{p-1} \\ a_p \end{bmatrix} = -\begin{bmatrix} R_{rr}(1) \\ \vdots \\ R_{rr}(p-1) \\ R_{rr}(p) \end{bmatrix} \qquad \text{Equation 2}$$

where Rrr(N) indicates an autocorrelation function of r(n) with lag N. In the case that a system function modeled using an autoregressive model is H(z), the power spectrum of the system may be expressed by Equation 3:

$$|H(\omega)|^2 = H(z)H(z^{-1}) = \frac{1}{1+a_1 z^{-2} + \cdots + a_p z^{-p}} \cdot \frac{1}{1+a_2 z + \cdots + a_p z^p}\bigg|_{z=e^{j\omega}}. \qquad \text{Equation 3}$$

The frequency estimator 310, by using Equation 3, may determine a frequency component with a maximum energy in the estimated power spectrum as a center frequency. As a degree of an autoregressive model increases, the accuracy of the estimated frequency spectrum may increase along with an increase of computational complexity, and thus the frequency estimator 310 may approximately determine a degree thereof depending on properties of the corresponding signals. For example, when a secondary autoregressive model is used, a system output estimated value s(n) may be expressed by Equation 4:

$$\tilde{s}(n) = -a_1 r(n-1) - a_2 r(n-2). \qquad \text{Equation 4}$$

That is, the estimated signals at time n s(n) may be calculated using a linear combination of two preceding signals. Secondary autoregressive model parameters a1 and a2 may be calculated by Equation 5 as follows:

$$a_1 = \frac{R_{rr}(1)R_{rr}(2) - R_{rr}(0)R_{rr}(1)}{R_{rr}(0)^2 - R_{rr}(1)^2}, \quad a_2 = \frac{R_{rr}(1)^2 - R_{rr}(0)R_{rr}(2)}{R_{rr}(0)^2 - R_{rr}(1)^2}. \qquad \text{Equation 5}$$

A center frequency $f_c$, having a maximum energy in a power spectrum expressed by a function of $a_1$ and $a_2$ calculated in Equation 5, may be obtained by differentiating Equation 3, which is a power spectrum function, with respect to ω. Therefore, the center frequency $f_c$ may be expressed by Equation 6:

$$f_c = \frac{f_s}{2\pi}\cos^{-1}\left(\frac{-a_1}{4}\left(1+\frac{1}{a_2}\right)\right) \qquad \text{Equation 6}$$

where $f_s$ indicates a sampling frequency of received signals r(n).

The frequency estimator 310 may estimate a center frequency of ultrasound data changing dynamically in accordance with a progress depth of ultrasound signals in an object.

Figure 6:
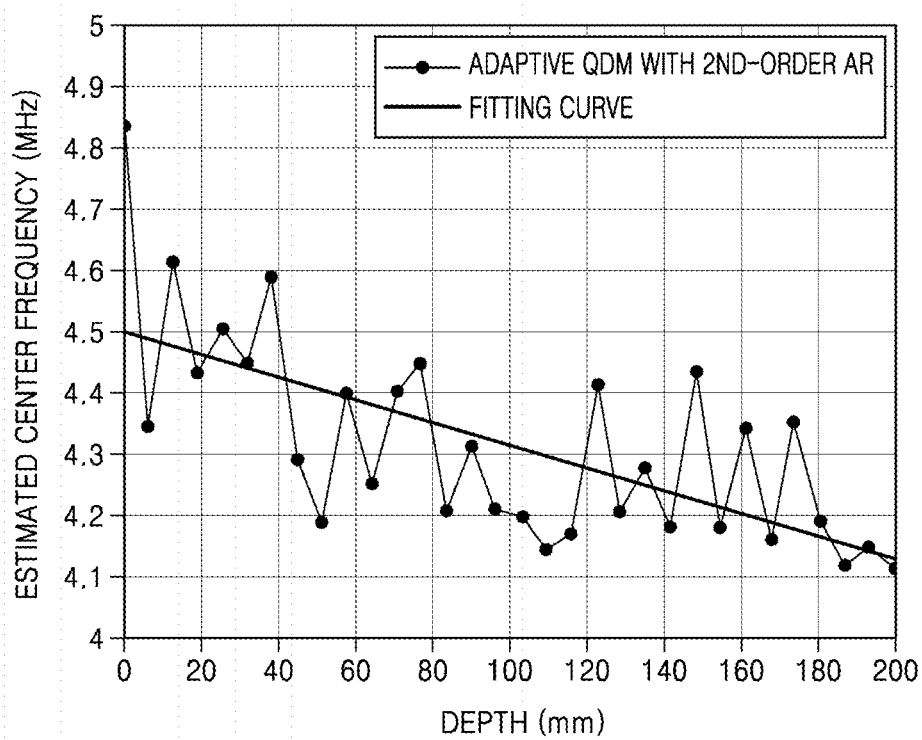
FIG. 6 is a graph illustrating a center frequency estimation function according to an embodiment.

In addition, due to the properties of actual signals in which noise elements are present, the estimated result may have a variation range of a constant width. Thus, the frequency estimator 310 may generate a center frequency estimation function using actually estimated center frequencies in accordance with depths of the object. For example, as illustrated in FIG. 6, to generate a center frequency estimation function, the frequency estimator 310 may fit estimated center frequencies corresponding with depths to a polynomial function. Accordingly, the frequency estimator 310 may use the frequency estimation function to estimate a center frequency corresponding to a depth.

Referring to FIG. 5, the dynamic I/Q demodulator 320 may include a mixer and a dynamic LPF.

The mixer may multiply cosine signals and sine signals, respectively, having the center frequency fc component estimated in the frequency estimator 310, with the input ultrasound data to generate in-phase and quadrature components and then generate complex baseband data. The LPF may perform low-pass filtering with respect to complex baseband data, and a cut-off frequency $f_{cutoff}$ of the LPF may be determined based on the estimated center frequency by Equation 7:

$$f_{cutoff}(n) = \frac{BW_{-6dB}}{2}(f_0 - f_{shift}(n)).\qquad\text{Equation 7}$$

where $BW_{-6\,dB}$ indicates −6 dB bandwidth of transmitting signals.

The complex baseband signals passed through the LPF may be expressed as Equation 8:

$$I(n)=[r(n)\cdot\cos(2\pi f_c(n)n)]_{LPF}$$

$$Q(n)=[r(n)\cdot-\sin(2\pi f_c(n)n)]_{LPF}.\qquad\text{Equation 8}$$

Referring to FIG. 5, the calculator 330 may perform L-fold decimation on the complex baseband signals I(n) and Q(n), which are expressed by Equation 8, to generate complex baseband data $I^d(n)$ and $Q^d(n)$.

Referring to FIG. 5, the pulse compression unit 340 may perform pulse compression with respect to the complex baseband data $I^d(n)$ and $Q^d(n)$. The pulse compression unit 340 may include a compression filter, and a coefficient of the compression filter may be determined based on the estimated center frequency $f_c$.

For example, the coefficient of the compression filter may be acquired by performing I/Q demodulation, low-pass filtering, and L-fold decimation on the coefficient c(n) of a compression filter used in pulse compression in the art, described in relation to FIG. 1, using the estimated center frequency $f_c$. The coefficient of the compression filter may be expressed by Equation 9:

$$c_{BB}(n)=I_{PC}(n)+jQ_{PC}(n)=\text{LPF}[c(n)\cdot e^{-j2\pi f_c n}]_{/L}$$

$$I_{PC}(n)=[c(n)\cdot\cos(2\pi f_c(n)n)]_{LPF}$$

$$Q_{PC}(n)=[c(n)\cdot-\sin(2\pi f_c(n)n)]_{LPF}\qquad\text{Equation 9}$$

where $I_{PC}(n)$ and $Q_{PC}(n)$ indicate an in-phase component and a quadrature component of the coefficient of the compression filter, respectively.

The pulse compression unit 340 may use the pulse compression filter to perform pulse compression on complex baseband data. The pulse-compressed data resulting from pulse compression of the complex baseband data may be expressed by Equation 10:

$$I_c^d(n)+jQ_c^d(n)=[I^d(n)+jQ^d(n)]*[I_{PC}(n)+jQ_{PC}(n)]=$$
$$(I^d*I_{PC}-Q^d*Q_{PC})+j(I^d*Q_{PC}+Q^d*I_{PC})\qquad\text{Equation 10}$$

where * indicates a convolution calculation, $I^d(n)$ and $Q^d(n)$ indicate complex baseband data acquired after performing I/Q demodulation and decimation.

In the pulse-compressed data expressed by Equation 10, even if four convolution calculations are required, since L-fold decimation was performed on input signals and the compression filter coefficient $c_{BB}(n)$, the total number of multiplications may be reduced by $L^2/4$.

The extractor 350 may perform SQRT calculation on an in-phase component $I_c^d(n)$ and a quadrature component $Q_c^d(n)$ of the pulse-compressed signals to extract the final envelope information.

In FIGS. 4 and 5, although a configuration of a processor according to an embodiment is illustrated and described, embodiments are not limited thereto, and the processor may also have other embodiments.

Figure 7F:
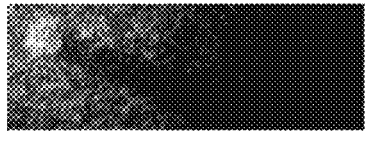
FIG. 7F is an enlarged view of an area of the image of FIG. 7B.
Figure 7E:
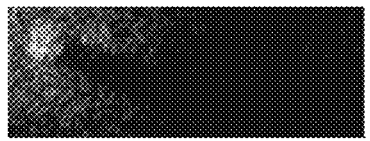
FIG. 7E is an enlarged view of an area of the image of FIG. 7A.
Figure 7B:
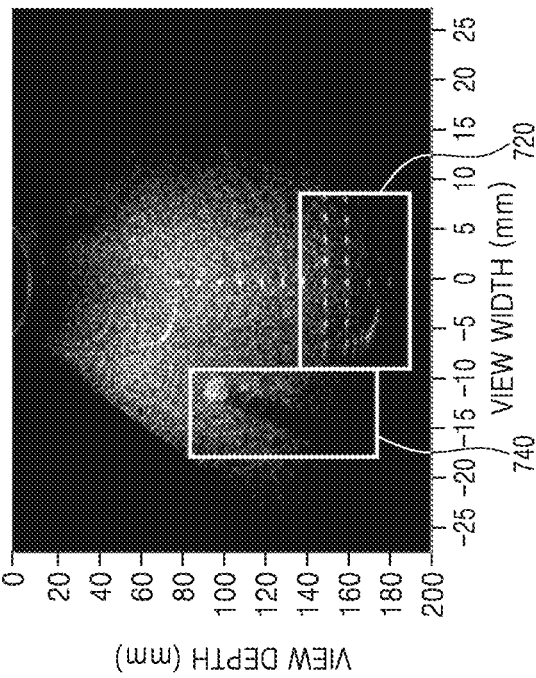
FIG. 7B is an ultrasound image obtained from pulse-compressed data obtained based on an estimated center frequency according to an embodiment.
Figure 7D:
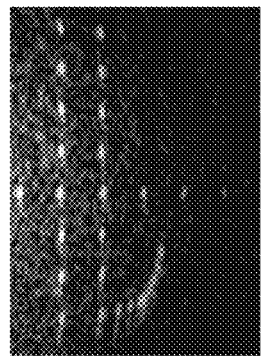
FIG. 7D is an enlarged view of an area of the image of FIG. 7B.
Figure 7A:
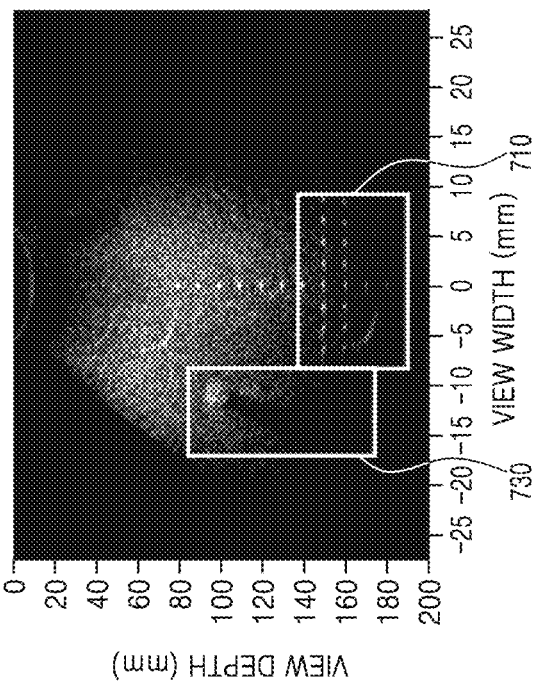
FIG. 7A is an ultrasound image obtained from pulse-compressed data without center frequency estimation.
Figure 7C:
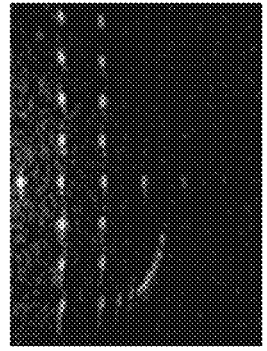
FIG. 7C is an enlarged view of an area of the image of FIG. 7A.

FIG. 7A is an ultrasound image obtained from pulse-compressed data without center frequency estimation. FIG. 7B is an ultrasound image obtained from pulse-compressed data obtained based on an estimated center frequency according to an embodiment. FIG. 7C is an enlarged view of a first area 710 of the image of FIG. 7A. FIG. 7D is an enlarged view of a second area 720 of the image of FIG. 7B corresponding to the first area 710. FIG. 7E is an enlarged view of a third area 730 of the image of FIG. 7A. FIG. 7F is an enlarged view of a fourth area 740 of the image of FIG. 7B corresponding to the third area 730.

By comparing FIG. 7C with FIG. 7D and FIG. 7E with FIG. 7F, it can be seen that, as compared with an ultrasound image generated from pulse-compressed data without center frequency estimation, an ultrasound image generated from pulse-compressed data based on the estimated center frequency according to an embodiment may be found to exhibit improved SNR as the depth of the object increases.

Figure 8:
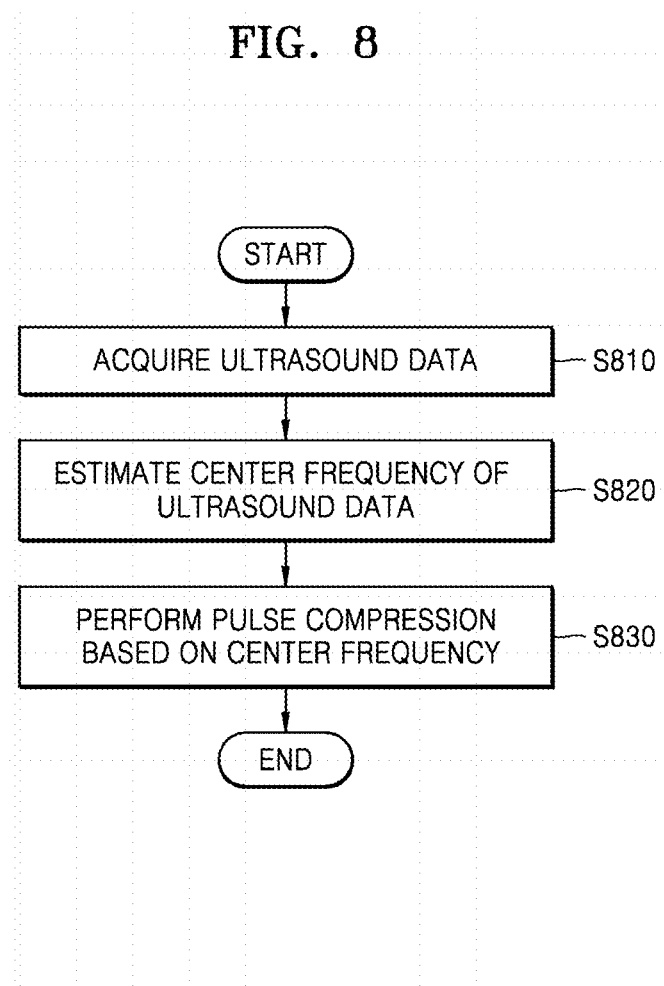
FIG. 8 is a flowchart showing a method of operating an ultrasound diagnosis apparatus according to an embodiment.

FIG. 8 is a flowchart showing a method of operating an ultrasound diagnosis apparatus 1000 according to an embodiment.

Referring to FIG. 8, the ultrasound diagnosis apparatus 100 according to an embodiment may acquire ultrasound data in operation S810.

The ultrasound diagnosis apparatus 100 may transmit ultrasound signals to an object and acquire ultrasound data based on received echo signals from the object. Here, the received echo signals may be elongated, i.e., temporally long signals, and may be ultrasound echo signals received when coded signals are transmitted. In addition, the ultrasound data may include at least one piece of a variety of channel data for beamforming and beamformed RF data.

In operation S820, the ultrasound diagnosis apparatus 100 may estimate a center frequency of the ultrasound data.

For example, the ultrasound diagnosis apparatus 100 may estimate a center frequency using the ultrasound data as an input of an autoregressive model, but embodiments are not limited thereto. Any suitable center frequency estimation technique known in the art, in addition to the autoregressive model, may be used to estimate a center frequency of ultrasound data.

In addition, to generate a center frequency estimation function, the ultrasound diagnosis apparatus 100 may fit actually estimated center frequencies corresponding with depths of the object to a polynomial function to generate a center frequency estimation function.

In operation S830, the ultrasound diagnosis apparatus 100 may perform pulse compression based on the estimated center frequency.

The ultrasound diagnosis apparatus 100 may adaptively I/Q demodulate ultrasound data using an estimated center frequency to generate complex baseband data. Here, the complex baseband data may be at least one of either chirp or arbitrary waveform signals.

In addition, the ultrasound diagnosis apparatus 100 may decimate complex baseband data. The ultrasound diagnosis apparatus 100 may perform pulse compression on the decimated complex baseband data to generate short signals from elongated signals. Here, a coefficient of a pulse compression filter that performs pulse compression may be determined based on the estimated center frequency.

The number of multiplications used to perform pulse compression may be in proportion to the product of the number of pieces of ultrasound data and the number of compression filters, and in inverse proportion to the square of a number L (from L-fold decimation of the complex baseband data).

In addition, the ultrasound diagnosis apparatus 100 may extract envelope information by calculating a square root of the pulse-compressed data. In addition, the ultrasound diagnosis apparatus 100 may generate and display an ultrasound image, based on the extracted envelope information.

Figure 9:
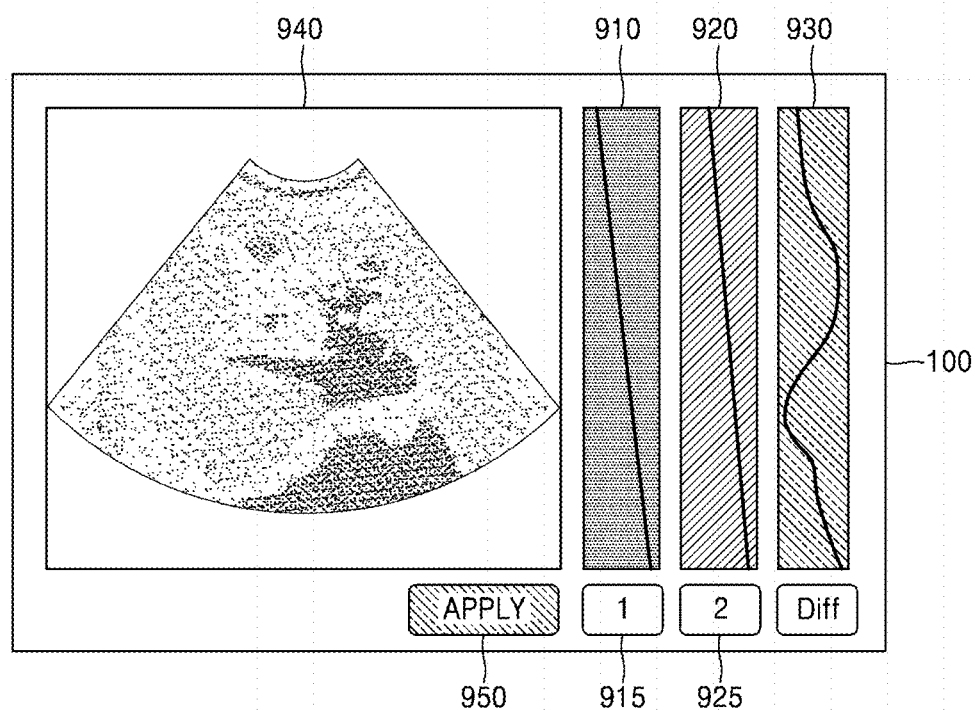
FIG. 9 is a view showing an embodiment of a screen displayed on an ultrasound diagnostic apparatus.

FIG. 9 is a view showing an embodiment of a screen displayed on an ultrasonic diagnostic apparatus.

Referring to FIG. 9, the ultrasound diagnosis apparatus 100, according to an embodiment, may display a center frequency of ultrasound data preset in the ultrasound diagnosis apparatus 100. For example, the ultrasound diagnosis apparatus 100 may set a center frequency in accordance with the depth of an object and display the set center frequency on a first area 910 in accordance with the depth. In addition, the ultrasound diagnosis apparatus 100 may estimate a center frequency, based on received ultrasound data, and display the estimated center frequency on a second area 920. For example, the ultrasound diagnosis apparatus 100 may display, as described in relation to FIG. 4, a frequency estimation function, generated based on the estimated center frequency, on the second area 920.

In addition, the ultrasound diagnosis apparatus 100 may display a difference between the preset center frequency and the estimated center frequency on a third area 930 as illustrated in FIG. 9. Accordingly, a user may easily recognize the difference between the preset center frequency and the estimated center frequency.

The ultrasound diagnosis apparatus 100 may generate an ultrasound image using either the preset center frequency or the estimated center frequency. When the ultrasound diagnosis apparatus 100 receives an input from selecting a first icon 915 and selecting an apply button 950, the preset center frequency may be applied thereto, and then pulse compression of the ultrasound data may be performed. Further, the ultrasound diagnosis apparatus 100 may generate an ultrasound image, based on the pulse-compressed ultrasound data. Alternatively, when the ultrasound diagnosis apparatus 100 receives an input from selecting a second icon 925 and selecting the apply button 950, the estimated center frequency may be applied thereto, and then pulse compression of the ultrasound data may be performed. Further, based on the pulse-compressed ultrasound data, the ultrasound diagnosis apparatus 100 may generate an ultrasound image. Here, the generated ultrasound image may be displayed on a fourth area 940 of the display.

The ultrasound diagnosis apparatus and the method of operating the ultrasound diagnosis apparatus, according to one or more embodiments, may be realized as computer readable codes on a non-transitory computer-readable recording medium. The non-transitory computer-readable recording medium may be any kind of recording device in which data are stored that can be read by a computer system. Examples of the non-transitory computer-readable recording medium includes ROMs, RAMs, CD-ROMs, magnetic tapes, floppy disks, and optical data storage devices, and further includes those embodied in the form of transmission media, such as Internet transmission media. The non-transitory computer-readable recording medium can also be distributed over network-coupled computer systems so that the computer readable code is stored and executed in a distributive manner, which can be read by a processor.

In addition, although embodiments have been illustrated and described above, the present disclosure is not limited specific embodiments described above but may be varied by those skilled in the art without departing from the subject matter of the present disclosure claimed in the following claims. Further, these variations should not be understood individually from the technical spirit or perspective of the present disclosure.

As described above, according to one or more embodiments, by performing pulse compression based on the estimated center frequency of ultrasound data, positional distortion of a target due to frequency-dependent signal attenuation may be compensated, and SNR, axial resolution, and contrast may improve.

According to one or more embodiments, by performing pulse compression on complex baseband signals, the number of pieces of data and a coefficient of a compression filter may decrease, thus lowering overall computational complexity of the pulse compression.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. An ultrasound diagnosis apparatus for performing pulse compression, the apparatus comprising:
   a data acquisition unit configured to acquire ultrasound data, based on received echo signals from an object;
   a display to display a predetermined center frequency of the ultrasound data; and
   a processor configured to:
   estimate a center frequency of the ultrasound data,
   control the display to display the estimated center frequency of the ultrasound data,
   receive a user input for selecting a selected center frequency from among the predetermined center frequency and estimated center frequency, and
   in response to the user input being received, perform pulse compression on the ultrasound data based on the selected center frequency,
   wherein the pulse compression generates short signals from elongated signals included in the ultrasound data.

2. The ultrasound diagnosis apparatus of claim 1, wherein the processor is configured to estimate the center frequency of the ultrasound data using the ultrasound data as an input of an autoregressive model.

3. The ultrasound diagnosis apparatus of claim 1, wherein the processor is configured to fit estimated center frequencies corresponding with depths of the object to a polynomial function, and estimate a center frequency of the ultrasound data corresponding to a depth of the object based on the polynomial function.

4. The ultrasound diagnosis apparatus of claim 1, wherein the processor is configured to dynamically I/Q demodulate the ultrasound data using the selected center frequency and perform the pulse compression on complex baseband data generated from the dynamic I/Q demodulation.

5. The ultrasound diagnosis apparatus of claim 4, wherein the processor further comprises a low-pass filter (LPF) configured to perform low-pass filtering on the complex baseband data, wherein a cutoff frequency of the LPF is determined based on the selected center frequency.

6. The ultrasound diagnosis apparatus of claim 4, wherein the processor is configured to decimate the complex baseband data and perform the pulse compression on the decimated data.

7. The ultrasound diagnosis apparatus of claim 1, wherein the processor further comprises a pulse compression filter that performs the pulse compression, wherein a coefficient of the pulse compression filter is determined based on the selected center frequency.

8. The ultrasound diagnosis apparatus of claim 1, wherein the processor is configured to perform a square root calculation on pulse-compressed data and extract envelope information based on the square root calculation.

9. The ultrasound diagnosis apparatus of claim 8, wherein the ultrasound diagnosis apparatus further comprises:
an image processor configured to generate an ultrasound image based on the envelope information; and
control the display to display the ultrasound image.

10. The ultrasound diagnosis apparatus of claim 1, wherein the ultrasound data acquired by the data acquisition unit is at least one piece of a variety of channel data for beamforming and beamformed RF data.

11. The ultrasound diagnosis apparatus of claim 1, wherein the selected center frequency is less than center frequencies of ultrasound signals transmitted to the object.

12. A method of operating an ultrasound diagnosis apparatus for performing pulse compression, the method comprising:
acquiring ultrasound data, based on received echo signals from an object;
displaying a predetermined center frequency of the ultrasound data;
estimating a center frequency of the ultrasound data;
displaying the estimated center frequency of the ultrasound data;
receiving a user input for selecting a selected center frequency from among the predetermined center frequency and estimated center frequency, and
in response to the user input being received, performing pulse compression on the ultrasound data based on the selected center frequency,
wherein the pulse compression generates short signals from elongated signals included in the ultrasound data.

13. The method of operating of claim 12, wherein the estimating of the center frequency of the ultrasound data comprises using the ultrasound data as an input of an autoregressive model.

14. The method of operating of claim 12, wherein the estimating of the center frequency of the ultrasound data comprises fitting estimated center frequencies corresponding with depths of the object to a polynomial function, and estimating a center frequency of the ultrasound data corresponding to a depth of the object based on the polynomial function.

15. The method of operating of claim 12, the method further comprising dynamically I/Q demodulating the ultrasound data using the selected center frequency, wherein the performing of the pulse compression comprises performing the pulse compression on complex baseband data generated from the dynamic I/Q demodulation.

16. The method of operating of claim 15, the method further comprising performing low-pass filtering on the complex baseband data by an LPF, wherein a cutoff frequency of the LPF is determined based on the selected center frequency.

17. The method of operating of claim 15, the method further comprising decimating the complex baseband data, wherein the performing of the pulse compression comprises performing the pulse compression on the decimated data.

18. The method of operating of claim 12, the method further comprising performing a square root calculation on pulse-compressed ultrasound data and extracting envelope information based on the square root calculation.

19. The method of operating of claim 18, the method further comprising generating an ultrasound image based on the envelope information and displaying the ultrasound image.

20. A non-transitory computer-readable recording medium having recorded thereon a program, which when executed by a computer, performs the method of claim 12.

* * * * *